United States Patent
Shichijoh et al.

(10) Patent No.: US 7,569,956 B2
(45) Date of Patent: Aug. 4, 2009

(54) AUTOMOTIVE TANDEM ALTERNATOR HAVING REDUCED AXIAL LENGTH AND IMPROVED STRUCTURE FOR EFFECTIVELY DISSIPATING HEAT GENERATED BY RECTIFIERS

(75) Inventors: Akiya Shichijoh, Yatomi (JP); Shin Kusase, Oobu (JP); Takeo Maekawa, Okazaki (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 11/785,864

(22) Filed: Apr. 20, 2007

(65) Prior Publication Data

US 2007/0247011 A1    Oct. 25, 2007

(30) Foreign Application Priority Data

Apr. 21, 2006    (JP) .............................. 2006-118104

(51) Int. Cl.
*H02K 11/04*    (2006.01)

(52) U.S. Cl. ........................ 310/58; 310/68 D; 310/114

(58) Field of Classification Search .................. 310/58, 310/60 R, 60 A, 62, 64, 68 D, 112–114
See application file for complete search history.

(56) References Cited

U.S. PATENT DOCUMENTS 3,459,980 A * 8/1969 Coroller ..................... 310/114
5,177,388 A * 1/1993 Hotta et al. .................. 310/114
7,116,022 B2 * 10/2006 Koumura et al. ........... 310/68 D
7,397,157 B2 * 7/2008 Maekawa et al. ............ 310/114
7,417,355 B2 * 8/2008 Shichijo et al. ............. 310/263
7,420,313 B2 * 9/2008 Okumoto et al. ............ 310/263

FOREIGN PATENT DOCUMENTS

| JP | 61039837 A | * | 2/1986 |
| JP | 04017551 A | * | 1/1992 |
| JP | A 11-098789 |   | 4/1999 |
| JP | 2005287123 A | * | 10/2005 |

* cited by examiner

*Primary Examiner*—Tran N Nguyen
(74) *Attorney, Agent, or Firm*—Oliff & Berridge, PLC

(57) ABSTRACT

According to the invention, a tandem alternator includes a rotary shaft, a first and a second power generation unit arranged in tandem in the axial direction of the rotary shaft, a housing accommodating the power generation units and having a plurality of air holes formed through a front end wall thereof, a pulley provided on a front end portion of the rotary shaft which protrudes outside from the first end wall of the housing, and a first and a second rectifier working to respectively rectify AC powers output from the first and second power generation units. The first rectifier is so fixed to the outer surface of the front end wall of the housing as to be located on the radially outside of the pulley and cover only part of the air holes. The second rectifier is fixed to the outer surface of a rear end wall of the housing.

19 Claims, 5 Drawing Sheets

AUTOMOTIVE TANDEM ALTERNATOR HAVING REDUCED AXIAL LENGTH AND IMPROVED STRUCTURE FOR EFFECTIVELY DISSIPATING HEAT GENERATED BY RECTIFIERS

CROSS-REFERENCE TO RELATED APPLICATION

This application is based on and claims priority from Japanese Patent Application No. 2006-118104, filed on Apr. 21, 2006, the content of which is hereby incorporated by reference into this application.

BACKGROUND OF THE INVENTION

1. Technical Field of the Invention

The present invention relates generally to electric generators. More particularly, the invention relates to a tandem alternator for a vehicle, which has a reduced axial length and an improved structure for effectively dissipating heat generated by rectifiers included therein.

2. Description of the Related Art

Japanese Patent First Publication No. H11-98789 discloses a tandem alternator for a vehicle, which includes a single rotary shaft and a front-side and a rear-side power generation unit that are arranged in tandem in the axial direction of the rotary shaft.

The tandem alternator further includes a pulley mounted on a front end portion of the rotary shaft and a first and a second rectifier that work to respectively rectify AC powers output from the front-side and rear-side power generation units into DC powers. The first and second rectifiers each generate a large amount of heat during operation of the alternator. To effectively dissipate the heat and minimize the distances from the rectifiers to the corresponding power generation units, the first and second rectifiers are respectively arranged at a front and a rear portion of the alternator.

More specifically, the tandem alternator includes a front end frame, a center frame, a housing, and a rear end frame, all of which together enclose both the front-side and rear-side power generation units. The first rectifier is fixed to an outer surface of the center frame, and is thus located inside the front frame. On the other hand, the second rectifier is fixed to an outer surface of the rear frame.

With the above arrangement, however, the total axial length of the tandem alternator is increased. This is because the first rectifier, which is interposed between the front and center frames, occupies a dedicated length in the axial direction of the rotary shaft.

Consequently, in installation of the tandem alternator to an engine of the vehicle, it may be difficult to suitably arrange the alternator without causing interference between the alternator and an inlet or exhaust pipe of the engine.

Accordingly, it is desired to reduce the axial length of the tandem alternator while securing effective dissipation of the heat generated by the first and second rectifiers.

SUMMARY OF THE INVENTION

The present invention has been made in view of the above-mentioned problems.

It is, therefore, a primary object of the present invention to provide a tandem alternator which has a reduced axial length and an improved structure for effectively dissipating heat generated by rectifiers included therein.

According to a first embodiment of the invention, there is provided a tandem alternator which includes a rotary shaft, a pulley provided on an end portion of the rotary shaft, a first and a second electric power generation unit, a housing, and a first and a second rectifier.

The first and second electric power generation units are arranged in tandem in an axial direction of the rotary shaft.

The housing rotatably supports the rotary shaft and accommodates therein both the first and second electric power generation units. The housing has a first and a second end wall that are apart from each other in the axial direction of the rotary shaft with the first and second electric power generation units intervening therebetween. The first end wall is closer to the first electric power generation unit than the second electric power generation unit. The second end wall is closer to the second electric power generation unit than the first electric power generation unit. The housing also accommodates therein the rotary shaft with the end portion of the rotary shaft protruding outside from the first end wall of the housing. The housing has a plurality of air holes that are formed through the first end wall of the housing and located outside the pulley in a radial direction of the rotary shaft.

The first and second rectifiers work to respectively rectify AC powers output from the first and second electric power generation units into DC powers. The first rectifier is so fixed to an outer surface of the first end wall of the housing as to be located outside the pulley in the radial direction of the rotary shaft and cover only part of the air holes. The second rectifier is fixed to an outer surface of the second end wall of the housing.

With the above arrangement, the first and second rectifiers are sufficiently apart from each other in the tandem alternator. Consequently, during operation of the tandem alternator, heat generated by the first and second rectifiers can be effectively dissipated, and electrical interference between the first and second rectifiers can be reliably prevented.

Further, with the above arrangement, both the distances between the first rectifier and the first power generation unit and between the second rectifier and the second power generation unit are made sufficiently short, thus effectively suppressing resistance losses occurring therebetween.

Moreover, since the first rectifier is arranged on the radially outside of the pulley, they share a common length in the axial direction of the rotary shaft. In other words, the first rectifier does not occupy a dedicated length in the axial direction. Consequently, with the above arrangement, it is possible to minimize the length of the tandem alternator in the axial direction of the rotary shaft.

Furthermore, since the first rectifier covers only part of the air holes formed through the first end wall of the housing, it is possible for a sufficient amount of cooling air to flow through the other uncovered air holes. In addition, since the first rectifier is exposed to the cooling air through the air holes covered thereby, the heat generated by the first rectifier can be further effectively dissipated.

Accordingly, compared to the above-described conventional tandem alternator, the tandem alternator according to the first embodiment of the invention has a reduced axial length and an improved structure for effectively dissipating heat generated by the first and second rectifiers.

It is preferable that the first rectifier includes a negative and a positive cooling fin.

Further, it is preferable that the negative cooling fin of the first rectifier is provided on a pedestal that is formed on the outer surface of the first end wall of the housing.

Alternatively, without such a pedestal, the negative cooling fin of the first rectifier may be directly provided on the outer surface of the first end wall of the housing.

The first rectifier preferably further includes a heat conduction sheet that is sandwiched between the negative and positive cooling fins.

The first rectifier preferably further includes an output terminal that is configured to extend upward over an outer diameter of the housing after installation of the tandem alternator.

It is preferable that the first rectifier outputs the DC power at a higher rated voltage and a lower rated maximum current and has a smaller volume than the second rectifier.

The first rectifier is preferably horseshoe-shaped to occupy a partial ring-like area on the outer surface of the first end wall of the housing.

Preferably, the housing further has a plurality of air holes that are formed through the second end wall of the housing; the second rectifier includes a negative and a positive cooling fin; at least part of the positive cooling fin of the second rectifier faces one of the air holes formed through the second end wall of the housing in the axial direction of the rotary shaft with an air gap formed therebetween.

The rotary shaft may be configured to be driven by an engine of an automobile.

According to a second embodiment of the invention, there is provided a tandem alternator which includes a rotary shaft, a first and a second electric power generation unit, a housing, a first and a second rectifier.

The first and second electric power generation units are arranged in tandem in an axial direction of the rotary shaft.

The housing rotatably supports the rotary shaft and accommodates therein both the first and second electric power generation units. The housing has a first and a second end wall that are apart from each other in the axial direction of the rotary shaft with the first and second electric power generation units intervening therebetween. The first end wall is closer to the first electric power generation unit than the second electric power generation unit. The second end wall is closer to the second electric power generation unit than the first electric power generation unit. The housing also has a side wall that extends between the first and second end walls and surrounds both the first and second electric power generation units. The side wall has an end portion adjoining the first end wall of the housing and a plurality of air holes formed through the end portion.

The first and second rectifiers work to respectively rectify AC powers output from the first and second electric power generation units into DC powers. The first rectifier is so fixed to an outer surface of the end portion of the side wall of the housing as to cover only part of the air holes. The second rectifier is fixed to an outer surface of the second end wall of the housing.

Compared to the conventional tandem alternator, the tandem alternator according to the second embodiment of the invention also has a reduced axial length and an improved structure for effectively dissipating heat generated by the first and second rectifiers.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

Figure 1:
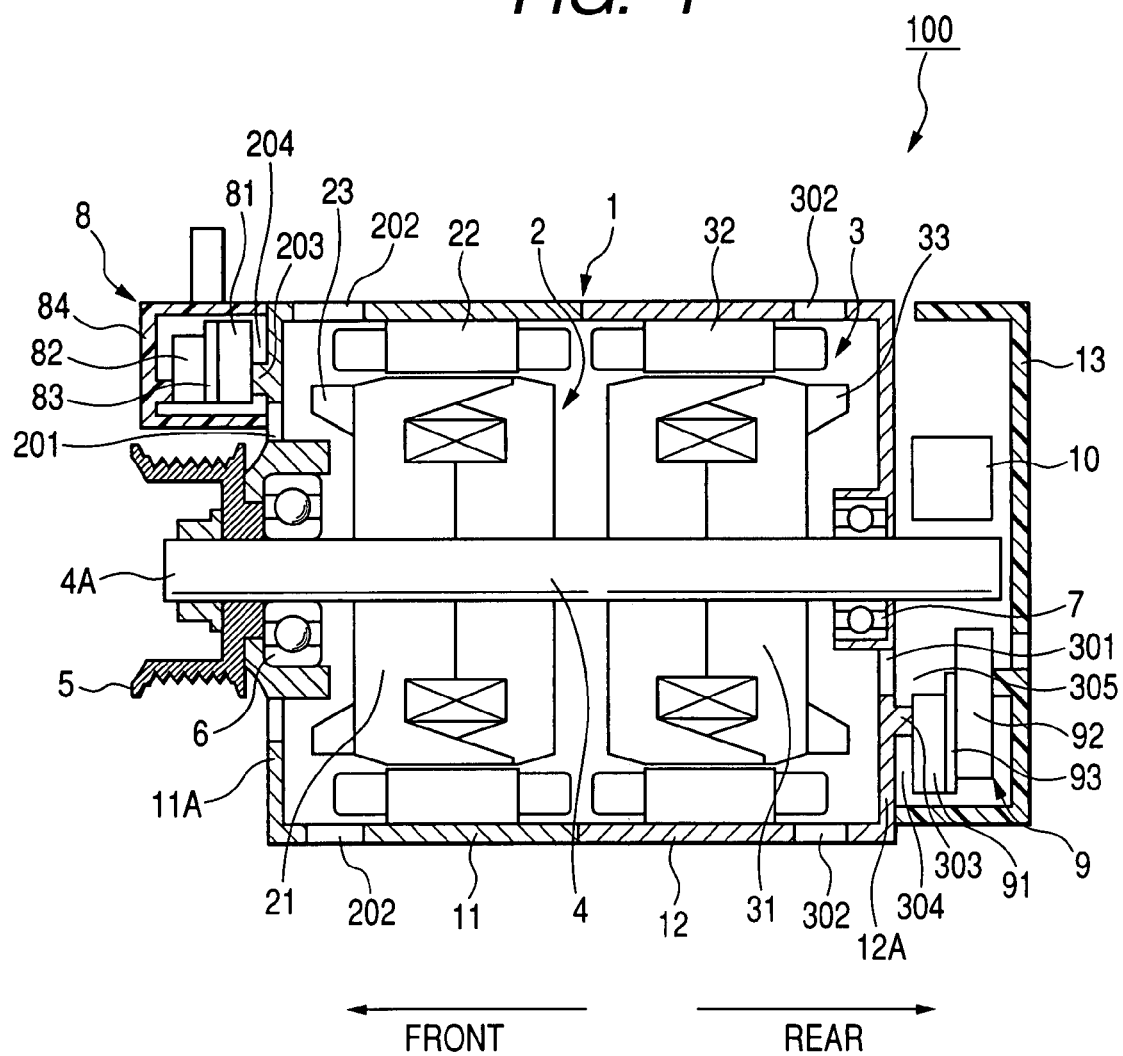
FIG. 1 is a schematic partially cross-sectional side view of a tandem alternator according to the first embodiment of the invention.

The preferred embodiments of the present invention will be described hereinafter with reference to FIGS. 1-5.

It should be noted that, for the sake of clarity and understanding, identical components having identical functions in different embodiments of the invention have been marked, where possible, with the same reference numerals in each of the figures.

First Embodiment

FIGS. 1-4 together show the overall configuration of a tandem alternator 100 according to the first embodiment of the invention.

As shown in those figures, the tandem alternator 100 includes a housing 1, a first power generation unit 2, a second power generation unit 3, a rotary shaft 4, a pulley 5, a pair of bearings 6 and 7, a first rectifier 8, a second rectifier 9, a slip ring-brush mechanism 10, and a rear cover 13.

In the present embodiment, the alternator 100 is designed for use in an automobile. More specifically, the alternator 100 is configured to be driven by an engine (not shown) of the automobile via the pulley 5 that is fitted on the rotary shaft 4.

The housing 1 consists of a front housing 11 and a rear housing 12, both of which are cup-shaped and made of a nonmagnetic material. The front and rear housings 11 and 12 are so connected as to cover each other in the axial direction of the rotary shaft 4.

Figure 2:
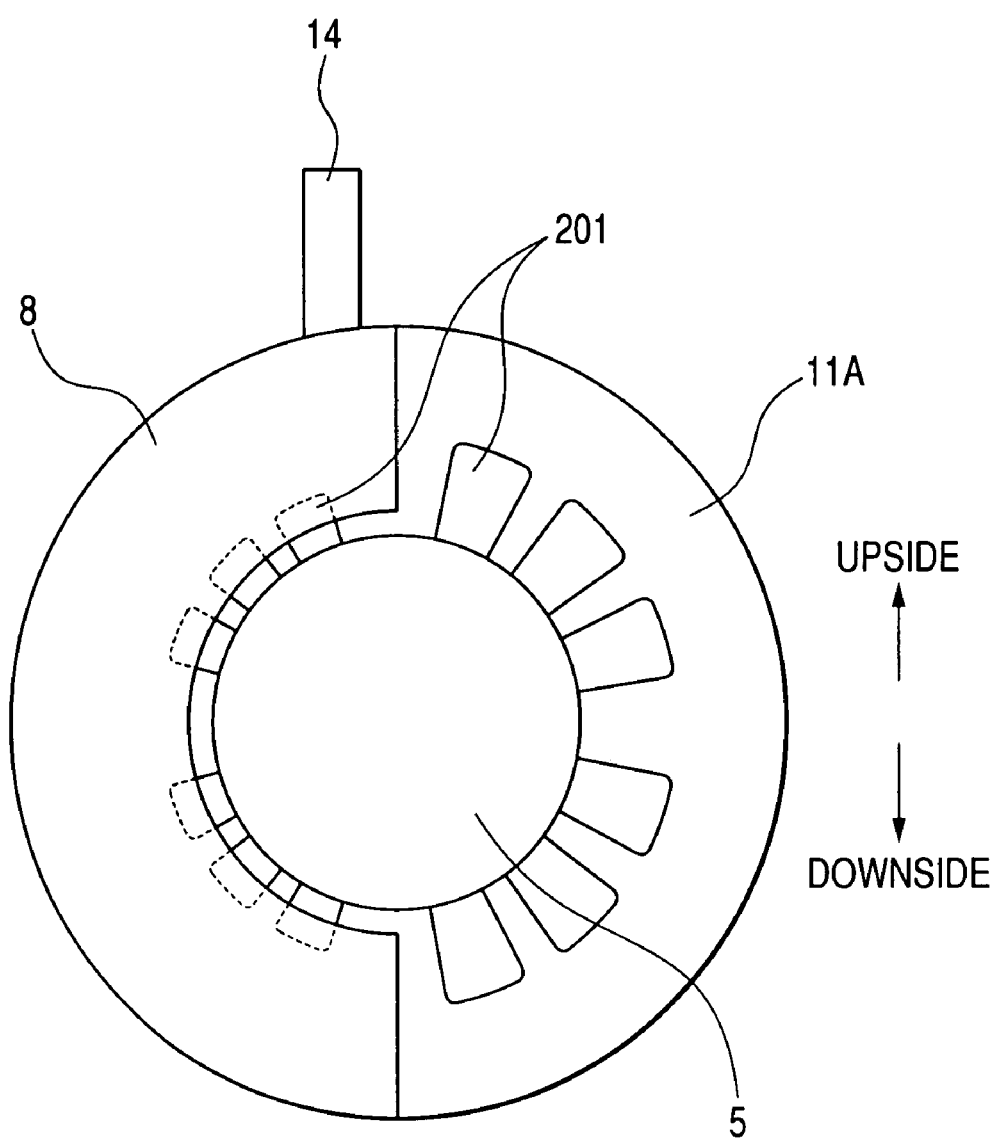
FIG. 2 is a schematic front end elevation of the tandem alternator.
Figure 3:
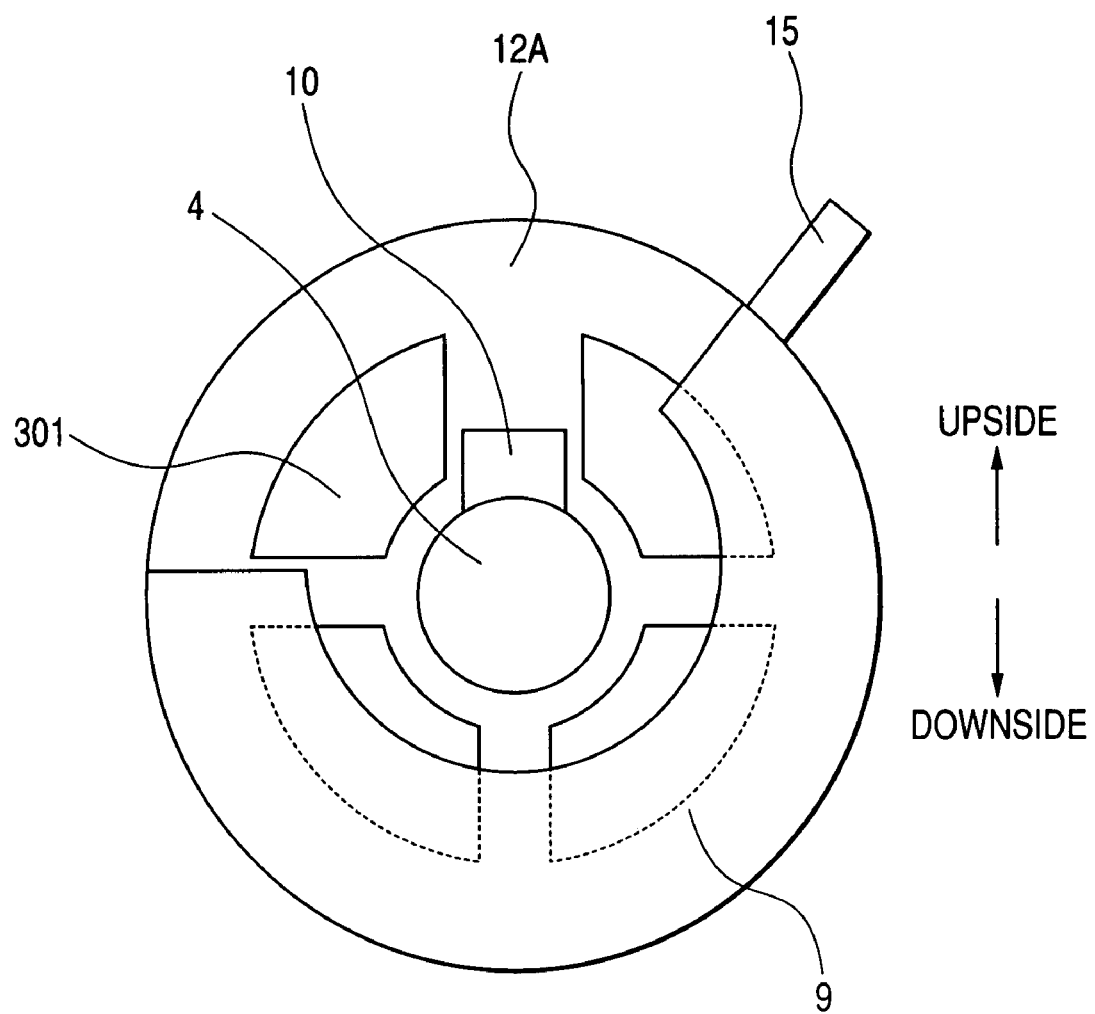
FIG. 3 is a schematic rear end elevation of the tandem alternator.
Figure 4:
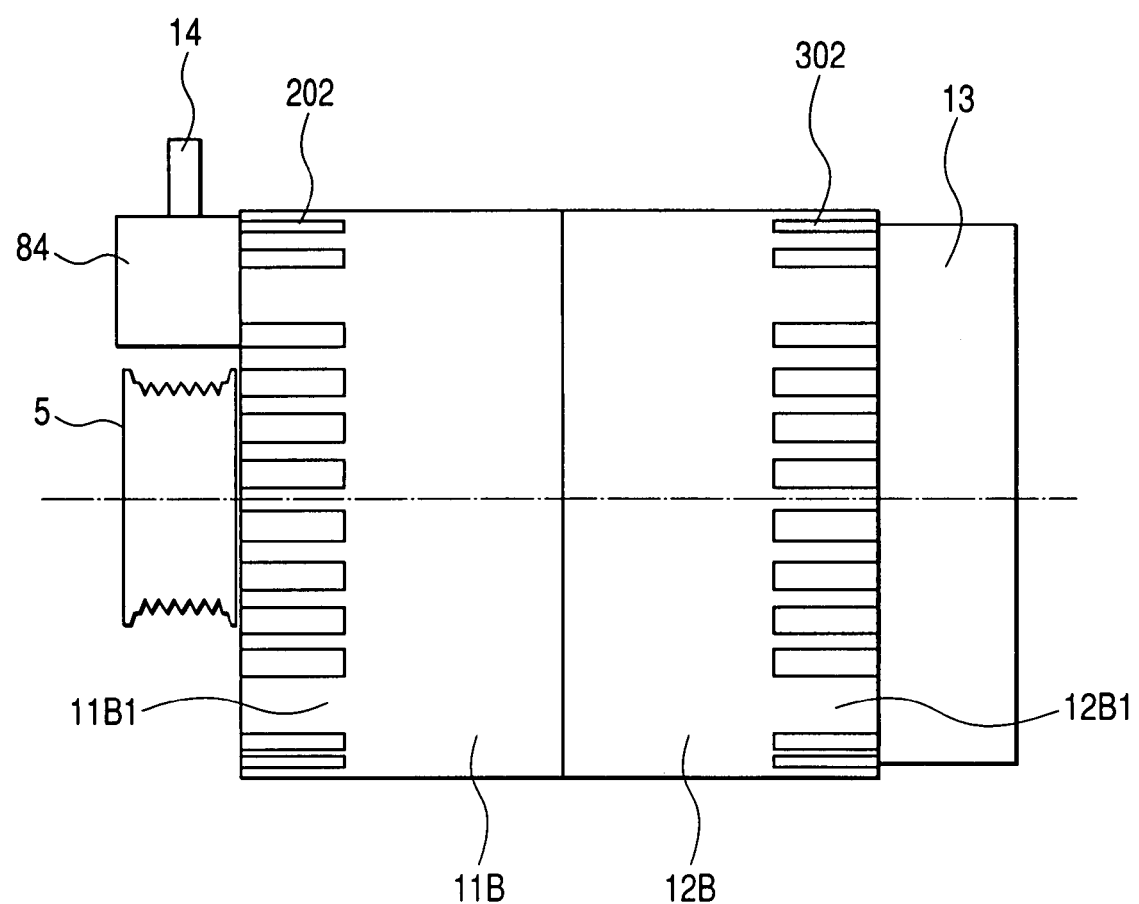
FIG. 4 is a schematic side elevation of the tandem alternator.

The front housing 11 has, as shown in FIG. 2, a plurality of cooling air inlets 201 that are formed through an end wall 11A of the front housing 11 and arranged around the rotary shaft 4. Similarly, the rear housing 12 has, as shown in FIG. 3, a plurality of cooling air inlets 301 that are formed through an end wall 12A of the rear housing 12 and arranged around the rotary shaft 4. Further, as shown in FIG. 4, the front housing 11 has a plurality of cooling air outlets 202 that are formed through a front end portion 11B1 of a side wall 11B of the front housing 11 and arranged along the circumferential direction of the rotary shaft 4. Similarly, the rear housing 12 has a plurality of cooling air outlets 302 that are formed through a rear end portion 12B1 of a side wall 12B of the rear housing 12 and arranged in the circumferential direction of the rotary shaft 4.

Moreover, in the front and rear housings 11 and 12, there are respectively provided the pair of bearings 6 and 7, through which the rotary shaft 4 is rotatably supported by the front and rear housings 11 and 12. In addition, a front end portion 4A of the rotary shaft 4 protrudes outside from the end wall 11A of the front housing 11, so as to allow the pulley 5 to be mounted thereon.

The first power generation unit 2 includes a first lundell-type field 21 provided on the rotary shaft 4 and a first armature 22 surrounding the first field 21. In addition, on the front end face of the first field 21, there is provided a front cooling fan 23 which works to suck cooling air into the front housing 11 through the cooling air inlets 201 and discharge it from the same through the cooling air outlets 202.

The second power generation unit 3 includes a second lundell-type field 31 and a second armature 32. The second field 31 is arranged on the rotary shaft 4 in tandem with the first field 21. The second armature 32 is arranged in tandem with the first armature 22 in the axial direction of the rotary shaft 4 and surrounds the second field 31. In addition, on the rear end face of the second field 31, there is provided a rear cooling fan 33, which works to suck cooling air into the rear housing 12 through the cooling air inlets 301 and discharge it from the same through the cooling air outlets 302.

The first and second rectifiers 8 and 9 are configured to respectively rectify AC powers output from the first and second power generation units 2 and 3 into DC powers.

In the present embodiment, the first rectifier 8 is fixed to the outer surface of the end wall 11A of the front housing 11 so that the first rectifier 8 is located on the radially outside of the pulley 5, as shown in FIG. 2. Further, the first rectifier 8 covers only part of the cooling air inlets 201. More specifically, in the present embodiment, the first rectifier 8 is horseshoe-shaped to occupy a semi-ring-like area on the outer surface of the end wall 11A of the front housing 11.

The first rectifier 8 includes a negative cooling fin 81, a positive cooling fin 82, a heat conduction sheet 83, and a resin-made cover 84.

The negative cooling fin 81 is horseshoe-shaped and has a plurality of negative diodes (not shown) mounted thereto. Similarly, the positive cooling fin 82 is also horseshoe-shaped and has a plurality of positive cooling diodes (not shown) mounted thereto. The negative and positive diodes together form a three-phase full-wave rectification circuit for rectifying the AC power output from the first power generation unit 2. The heat conduction sheet 83 has a thickness of, for example, 1 mm, and is sandwiched between the negative and positive cooling fins 81 and 82 to transfer heat therebetween. The cover 84 is also horseshoe-shaped and covers the negative and positive cooling fins 81 and 82 and the heat conduction sheet 83, thereby protecting them from foreign matters, such as water or oil.

Moreover, in the present embodiment, there is formed a pedestal 203 on the outer surface of the end wall 11A of the front housing 11. The negative cooling fin 81 of the first rectifier 8 is mounted on the pedestal 203, so that an air gap 204 is formed between the negative cooling fin 81 and the outer surface of the end wall 11A of the front housing 11. In addition, the first rectifier 8 further includes an output terminal 14 that is configured to extend upward over the outer diameter of the front housing 11 after installation of the tandem alternator 100, as shown in FIG. 2.

On the other hand, the second rectifier 9 is fixed to the outer surface of the end wall 12A of the rear housing 12, as shown in FIG. 3. The second rectifier 9 is also horseshoe-shaped so as to cover only part of the cooling air inlets 301 formed through the end wall 12A of the rear housing 12. In addition, as seen from FIGS. 2 and 3, the position of the second rectifier 9 is different from that of the first rectifier 8 in the circumferential direction of the rotary shaft 4.

The second rectifier 9 includes a negative cooling fin 91, a positive cooling fin 92, and a heat conduction sheet 93. The negative cooling fin 91 is horseshoe-shaped and has a plurality of negative diodes (not shown) mounted thereto. Similarly, the positive cooling fin 92 is also horseshoe-shaped and has a plurality of positive diodes mounted thereto. The negative and positive diodes together form a three-phase full-wave rectification circuit for rectifying the AC power output from the second power generation unit 3. The heat conduction sheet 93 has a thickness of, for example, 1 mm, and is sandwiched between the negative and positive cooling fins 91 and 92 to transfer heat therebetween.

Moreover, in the present embodiment, there is formed a pedestal 303 on the outer surface of the end wall 12A of the rear housing 12. The negative cooling fin 91 of the second rectifier 9 is mounted on the pedestal 303, so that an air gap 304 is formed between the negative cooling fin 91 and the outer surface of the end wall 12A of the rear housing 12. Further, the positive cooling fin 92 is configured to protrude radially inward from the neighboring heat conduction sheet 93, so that part of the positive cooling fin 92 faces one of the cooling air inlets 301 with an air gap 305 formed therebetween. Furthermore, the positive diodes (not shown) are mounted to the other part of the positive cooling fin 92 which overlaps with the heat conduction sheet 93. In addition, the second rectifier 9 further includes an output terminal 15 that is configured to extend obliquely upward over the outer diameter of the rear housing 12 after installation of the tandem alternator 100, as shown in FIG. 3.

In the present embodiment, the first rectifier 8 is configured to output the DC power at a higher rated voltage and a lower rated maximum current than the second rectifier 9. More specifically, in the present embodiment, the rated voltage of the DC power output from the first rectifier 8 is 42 V, while that of the DC power output from the second rectifier 9 is 12V. The DC power output from the output terminal 14 of the first rectifier 8 is provided to charge a high-voltage battery and feed high-voltage loads on the automobile, while that output from the output terminal 15 of the second rectifier 9 is provided to charge a low-voltage battery and feed low-voltage loads on the automobile.

The slip ring-brush mechanism 10 is provided around a rear end portion of the rotary shaft 4, which protrudes outside from the end wall 12A of the rear housing 12, and works to pass both a first and a second field current respectively to the first and second fields 21 and 31 of the first and second power generation units 2 and 3. Since supply of field currents via such a slip ring-brush mechanism is well known in the art, and thus the slip ring-brush mechanism 10 is only schematically depicted in FIG. 1.

In addition, the tandem alternator 100 further includes a voltage regulator (not shown) that works to regulate both the voltages of the DC powers output from the first and second rectifiers 8 and 9 through respectively controlling the first and second field currents. The voltage regulator may be fixed, for example, to the outer surface of the end wall 12A of the rear housing 12.

The rear cover 13 is fixed to the outer surface of the end wall 12A of the rear housing 12 to cover, at least, the second rectifier 9 and the slip ring-brush mechanism 10, thereby protecting them from foreign matters.

The above-described tandem alternator 100 operates in the same way as any other tandem alternators well-known in the art; thus, description of the operation thereof is omitted hereafter.

The tandem alternator 100 according to the present embodiment has the following advantages.

As described previously, in the tandem alternator 100, the first and second rectifiers 8 and 9 are respectively fixed to the outer surfaces of the end walls 11A and 12A of the front and rear housings 11 and 12. In other words, the first and second rectifiers 8 and 9 are sufficiently apart from each other in the tandem alternator 100.

Consequently, during operation of the tandem alternator 100, heat generated by the first and second rectifiers 8 and 9 can be effectively dissipated, and electrical interference between the first and second rectifiers 8 and 9 can be reliably prevented.

Further, with the above arrangement of the first and second rectifiers 8 and 9, both the distances between the first rectifier 8 and the first power generation unit 2 and between the second rectifier 9 and the second power generation unit 3 are made sufficiently short, thus effectively suppressing resistance losses occurring therebetween.

Moreover, since the first rectifier 8 is arranged on the radially outside of the pulley 5, they share a common length in the axial direction of the rotary shaft 4. In other words, the first rectifier 8 does not occupy a dedicated length in the axial direction of the rotary shaft 4.

Consequently, with the above arrangement, it is possible to minimize the length of the tandem alternator 100 in the axial direction of the rotary shaft 4.

Furthermore, since the first rectifier 8 covers only part of the cooling air inlets 201 formed through the end wall 11A of the front housing 11, it is possible for a sufficient amount of cooling air to be sucked into the front housing 11 through the other uncovered cooling air inlets 201.

In addition, since the first rectifier 8 is exposed to the cooling air flow created by the front cooling fan 23 through the cooling air inlets 201 covered thereby, the heat generated by the first rectifier 8 can be further effectively dissipated.

Accordingly, compared to the above-described conventional tandem alternator, the tandem alternator 100 according to the present embodiment has a reduced axial length and an improved structure for effectively dissipating heat generated by the first and second rectifiers 8 and 9.

Further, in the tandem alternator 100 according to the present embodiment, the negative cooling fins 81 and 91 of the first and second rectifiers 8 and 9 are respectively arranged on the pedestals 203 and 303, thus forming the air gap 204 between the negative cooling fin 81 and the end wall 11A of the front housing 11 and the air gap 304 between the negative cooling fin 91 and the end wall 12A of the rear housing 12.

Consequently, with the air gaps 204 and 304, a large amount of cooling air can be smoothly sucked into both the front and rear housings 11 and 12 respectively through all the cooling air inlets 201 and all the cooling air inlets 301, thereby enhancing cooling of the tandem alternator 100. At the same time, foreign matters can be prevented from flowing into the front housing 11 through those of the cooling air inlets 201 which are covered by the first rectifier 8.

In addition, through arranging the negative cooling fins 81 and 91 respectively on the pedestals 203 and 303, both of them can be easily grounded during wiring process.

In the tandem alternator 100 according to the present embodiment, there are provided the heat conduction sheets 83 and 93 respectively between the negative and positive cooling fins 81 and 82 of the first rectifier 8 and between the negative and positive cooling fins 91 and 92 of the second rectifier 9.

Consequently, through the heat conduction sheets 83 and 93, heat generated by the positive diodes can be effectively transferred from the positive cooling fins 82 and 92 to the negative cooling fins 81 and 91, thereby being further transferred to the front and rear housings 11 and 12.

In the tandem alternator 100 according to the present embodiment, the output terminal 14 of the first rectifier 8 is configured to extend upward over the outer diameter of the front housing 11, and the output terminal 15 of the second rectifier 9 is configured to extend obliquely upward over the outer diameter of the rear housing 12.

With the above configuration, both the output terminals 14 and 15 can be protected from water damage, thus ensuing high insulation performance of the tandem alternator 100.

In the tandem alternator 100 according to the present embodiment, the first rectifier 8 is configured to output the DC power at the higher rated voltage and the lower rated maximum current, and thus has the smaller volume than the second rectifier 9.

With the above configuration, the first rectifier 8 can be easily fixed to the outer surface of the end wall 11A of the front housing 11 without causing interference with the pulley 5. Moreover, though the second rectifier 9 generates more heat than the first rectifier 8 during operation, the heat generated by the second rectifier 9 can be effectively dissipated through the negative and positive cooling fins 91 and 92 that are larger than the negative and positive cooling fins 81 and 82 of the first rectifier 8.

In the tandem alternator 100 according to the present embodiment, the first rectifier 8 is configured to have a horseshoe shape.

With the horseshoe shape, the first rectifier 8 can be suitably fixed to the outer surface of the end wall 11A of the front housing 11 to cover only part of the cooling air inlets 201 without causing interference with the pulley 5.

In the tandem alternator 100 according to the present embodiment, part of the positive cooling fin 92 of the second rectifier 9 faces one of the cooling air inlets 301 with the air gap 305 formed therebetween, and the positive diodes are mounted to the other part of the positive cooling fin 92 which overlaps with the heat conduction sheet 93.

With the above configuration, heat generated by the positive diodes of the second rectifier 9 can be effectively dissipated by the cooling air flow created by the rear cooling fan 33. At the same time, the positive diodes can be reliably protected from foreign matters mixed in the cooling air flow.

Second Embodiment

This embodiment illustrates a tandem alternator 200 which has a structure almost identical to that of the tandem alternator 100 according to the previous embodiment. Accordingly, only the differences therebetween will be described hereinafter.

Figure 5:
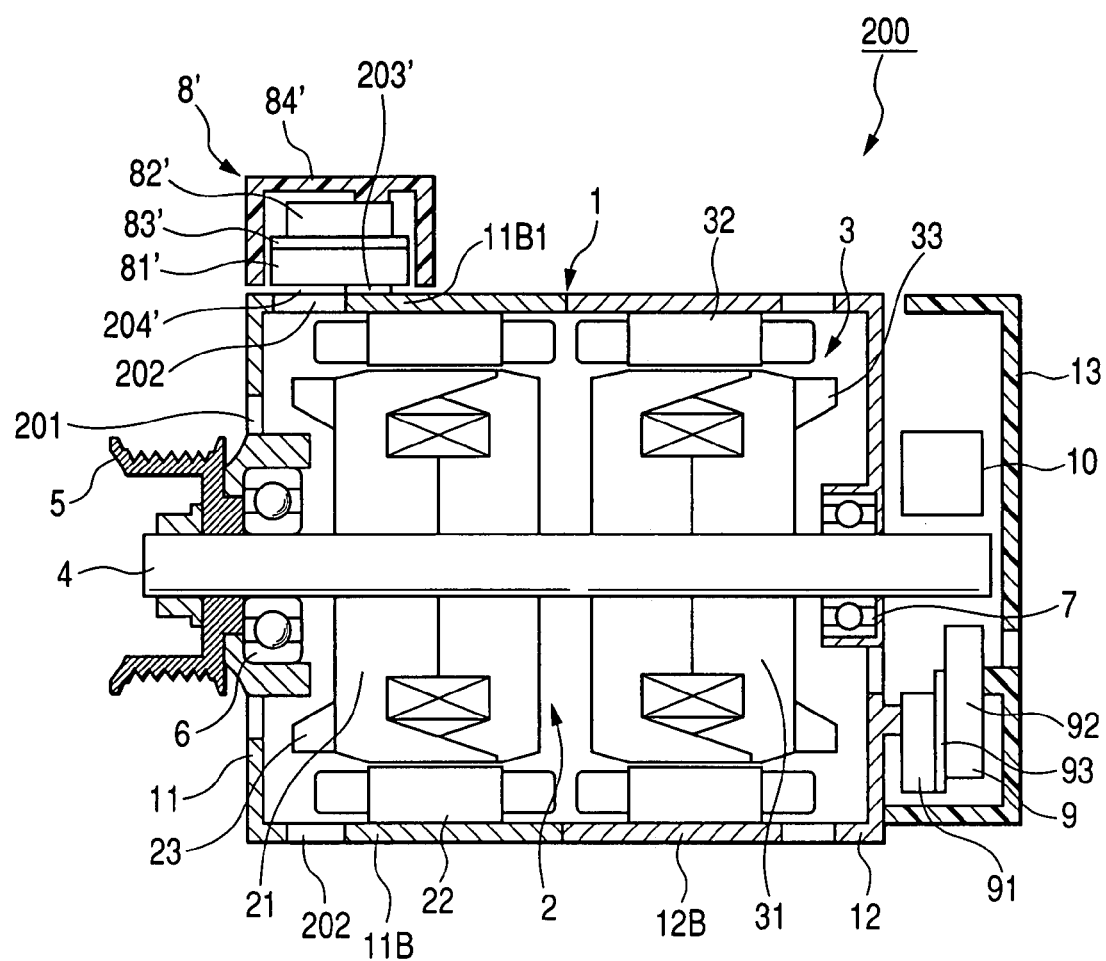
FIG. 5 is a schematic partially cross-sectional side view of a tandem alternator according to the second embodiment of the invention.

Referring to FIG. 5, in the tandem alternator 200, the first rectifier 8' is fixed to the outer surface of the front end portion 11B1 of the side wall 11B of the front housing 11, instead of to the outer surface of the end wall 11A as in the tandem alternator 100.

More specifically, as descried in the previous embodiment, the front housing 11 has the cooling air outlets 202 formed through the front end portion 11B1 of the side wall 11B. The first rectifier 8' is so provided on the outer surface of the front end portion 11B1 of the side wall 11 as to cover only part of the cooling air outlets 202. Further, according to the present embodiment, the front housing 11 has a pedestal 203' formed on the outer surface of the front end portion 11B1 of the side wall 11B. The negative cooling fin 81' of the first rectifier 8' is mounted on the pedestal 203', so that an air gap 204' is formed between the negative cooling fin 81' and the outer surface of the front end portion 11B1 of the side wall 11.

Consequently, with the air gap 204', cooling air can be smoothly discharged from the front housing 11 through all the cooling air outlets 202; at the same time, the first rectifier 8' can also be effectively cooled by the cooling air.

In addition, the tandem alternator 200 according to the present embodiment has the other advantages of the tandem alternator 100 described in the previous embodiment.

While the above particular embodiments of the invention have been shown and described, it will be understood by those who practice the invention and those skilled in the art that various modifications, changes, and improvements may be made to the invention without departing from the spirit of the disclosed concept.

For example, though the negative cooling fins 81 and 91 are respectively provided on the pedestals 203 and 303 in the first embodiment, they may be directly provided on the outer surfaces of the end walls 11A and 11B of the front and rear housings 11 and 12, respectively, thereby further reducing the axial length of the tandem alternator 100. Further, they may also be respectively provided as integral parts of the end walls 11A and 11B of the front and rear housings 11 and 12.

Similarly, though the negative cooling fin 81' of the first rectifier 8 is provided on the pedestal 203' in the second embodiment, it may be directly provided on the outer surface of the front end portion 11B1 of the side wall 11B of the front housing 11, thereby reducing the outer diameter of the tandem alternator 200. Further, it may also be provided as an integral part of the side wall 11B of the front housing 11.

Such modifications, changes, and improvements within the skill of the art are intended to be covered by the appended claims.

What is claimed is:

1. A tandem alternator comprising:
a rotary shaft;
a pulley provided on an end portion of the rotary shaft;
a first and a second electric power generation unit that are arranged in tandem in an axial direction of the rotary shaft;
a housing rotatably supporting the rotary shaft and accommodating therein both the first and second electric power generation units, the housing having a first and a second end wall that are apart from each other in the axial direction of the rotary shaft with the first and second electric power generation units intervening therebetween, the first end wall being closer to the first electric power generation unit than the second electric power generation unit, the second end wall being closer to the second electric power generation unit than the first electric power generation unit, the housing also accommodating therein the rotary shaft with the end portion of the rotary shaft protruding outside from the first end wall of the housing, the housing having a plurality of air holes that are formed through the first end wall of the housing and located outside the pulley in a radial direction of the rotary shaft; and
a first and a second rectifier working to respectively rectify AC powers output from the first and second electric power generation units into DC powers, the first rectifier being so fixed to an outer surface of the first end wall of the housing as to be located outside the pulley in the radial direction of the rotary shaft and cover only part of the air holes, the second rectifier being fixed to an outer surface of the second end wall of the housing.

2. The tandem alternator as set forth in claim 1, wherein the first rectifier includes a negative and a positive cooling fin,
a pedestal is formed on the outer surface of the first end wall of the housing, and
the negative cooling fin of the first rectifier is provided on the pedestal.

3. The tandem alternator as set forth in claim 2, wherein the first rectifier further includes a heat conduction sheet that is sandwiched between the negative and positive cooling fins.

4. The tandem alternator as set forth in claim 3, wherein the first rectifier further includes an output terminal that is configured to extend upward over an outer diameter of the housing after installation of the tandem alternator.

5. The tandem alternator as set forth in claim 1, wherein the first rectifier includes a negative and a positive cooling fin, and
the negative cooling fin of the first rectifier is directly provided on the outer surface of the first end wall of the housing.

6. The tandem alternator as set forth in claim 5, wherein the first rectifier further includes a heat conduction sheet that is sandwiched between the negative and positive cooling fins.

7. The tandem alternator as set forth in claim 6, wherein the first rectifier further includes an output terminal that is configured to extend upward over an outer diameter of the housing after installation of the tandem alternator.

8. The tandem alternator as set forth in claim 1, wherein the first rectifier outputs the DC power at a higher rated voltage and a lower rated maximum current and has a smaller volume than the second rectifier.

9. The tandem alternator as set forth in claim 1, wherein the first rectifier is horseshoe-shaped to occupy a partial ring-like area on the outer surface of the first end wall of the housing.

10. The tandem alternator as set forth in claim 1, wherein the housing further has a plurality of air holes that are formed through the second end wall of the housing,
the second rectifier includes a negative and a positive cooling fin, and
at least part of the positive cooling fin of the second rectifier faces one of the air holes formed through the second end wall of the housing in the axial direction of the rotary shaft with an air gap formed therebetween.

11. The tandem alternator as set forth in claim 1, wherein the rotary shaft is configured to be driven by an engine of an automobile.

12. A tandem alternator comprising:
a rotary shaft;
a first and a second electric power generation unit that are arranged in tandem in an axial direction of the rotary shaft;
a housing rotatably supporting the rotary shaft and accommodating therein both the first and second electric power generation units, the housing having a first and a second end wall that are apart from each other in the axial direction of the rotary shaft with the first and second electric power generation units intervening therebetween, the first end wall being closer to the first electric power generation unit than the second electric power generation unit, the second end wall being closer to the second electric power generation unit than the first electric power generation unit, the housing also having a side wall that extends between the first and second end walls and surrounds both the first and second electric power generation units, the side wall having an end portion adjoining the first end wall of the housing and a plurality of air holes formed through the end portion; and
a first and a second rectifier working to respectively rectify AC powers output from the first and second electric power generation units into DC powers, the first rectifier being so fixed to an outer surface of the end portion of the side wall of the housing as to cover only part of the air holes, the second rectifier being fixed to an outer surface of the second end wall of the housing.

13. The tandem alternator as set forth in claim 12, wherein the first rectifier includes a negative and a positive cooling fin,
  a pedestal is formed on the outer surface of the end portion of the side wall of the housing, and
  the negative cooling fin of the first rectifier is provided on the pedestal.

14. The tandem alternator as set forth in claim 13, wherein the first rectifier further includes a heat conduction sheet that is sandwiched between the negative and positive cooling fins.

15. The tandem alternator as set forth in claim 12, wherein the first rectifier includes a negative and a positive cooling fin, and
  the negative cooling fin of the first rectifier is directly provided on the outer surface of the end portion of the side wall of the housing.

16. The tandem alternator as set forth in claim 15, wherein the first rectifier further includes a heat conduction sheet that is sandwiched between the negative and positive cooling fins.

17. The tandem alternator as set forth in claim 12, wherein the first rectifier outputs the DC power at a higher rated voltage and a lower rated maximum current and has a smaller volume than the second rectifier.

18. The tandem alternator as set forth in claim 12, wherein the housing further has a plurality of air holes that are formed through the second end wall of the housing,
  the second rectifier includes a negative and a positive cooling fin, and
  at least part of the positive cooling fin of the second rectifier faces one of the air holes formed through the second end wall of the housing in the axial direction of the rotary shaft with an air gap formed therebetween.

19. The tandem alternator as set forth in claim 12, wherein the rotary shaft is configured to be driven by an engine of an automobile.

* * * * *